March 12, 1940.  G. A. LYON  2,193,105
ORNAMENTAL MEMBER MOUNTING MEANS
Filed May 3, 1937
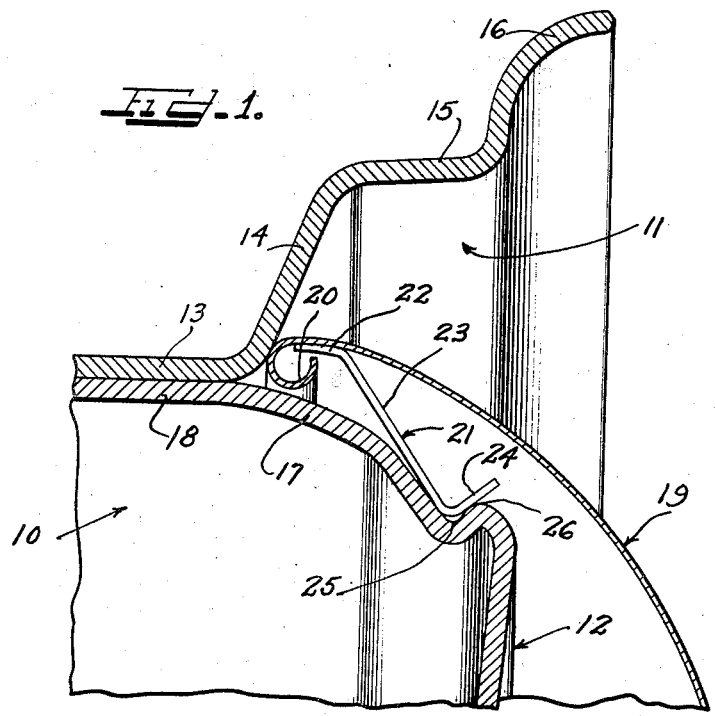
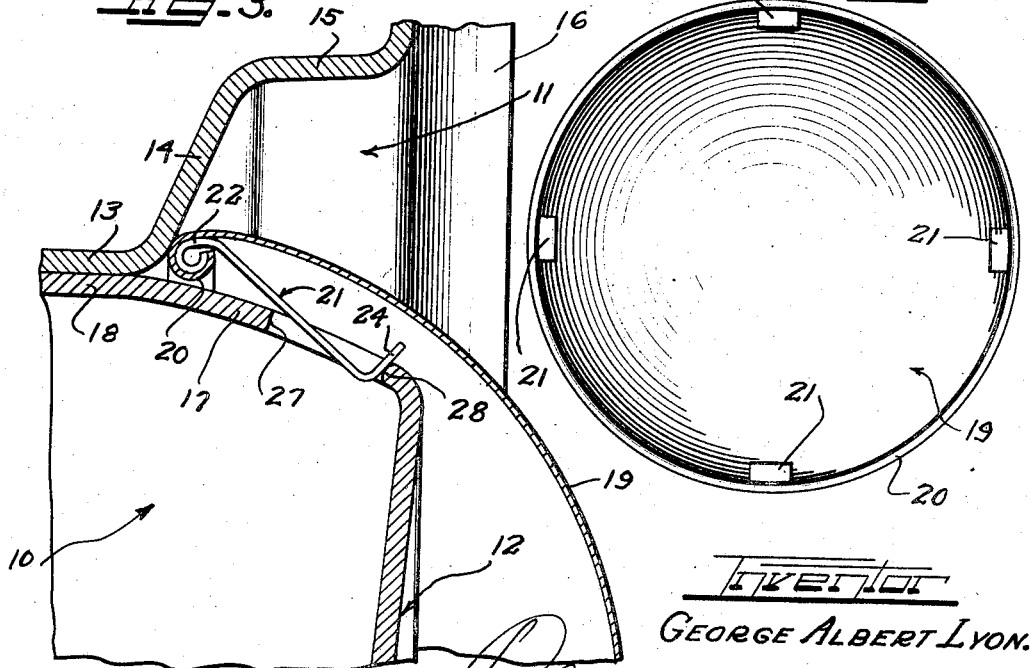
Inventor
GEORGE ALBERT LYON.

Patented Mar. 12, 1940

2,193,105

UNITED STATES PATENT OFFICE 2,193,105

ORNAMENTAL MEMBER MOUNTING MEANS

George Albert Lyon, Allenhurst, N. J.

Application May 3, 1937, Serial No. 140,287

10 Claims. (Cl. 301—37)

This invention relates to means for mounting an ornamental member on a wheel and more particularly to a means which is carried by the ornamental member, and which is adapted to make an easy-on, hard-off detachable engagement with the wheel.

In designing ornamental members for disposition over the outer side of a vehicle wheel, it is considered important to provide a construction which may quickly and easily be assembled which will not accidentally come off due to vibration or sudden jar, and which may readily be disassembled when desired. The most desirable constructions include a mounting means which requires very little effort or force to assemble the ornamental member on the wheel, but which requires a relatively great force to remove the ornamental member from the wheel. Preferably a mounting means of this type should be hidden from view in the assembled position of the ornamental member on the wheel. It has also been found desirable under certain circumstances to arrange the wheel assembly in such a way that the mounting means is carried by the ornamental member rather than by the wheel.

It is an object of this invention to provide a novel wheel assembly possessing the above highly desirable characteristics.

Another object of this invention is to provide an ornamental member with novel mounting means thereon which is economical to manufacture and which is rugged and reliable in use.

A further object of this invention is to provide an ornamental member with novel mounting means which makes a detachable easy-on, hard-off securing engagement with a vehicle wheel.

Another and further object of this invention is to provide novel means for mounting an ornamental member on a wheel including a plurality of flexible spring elements of novel design mounted on the ornamental member and adapted to operate in a novel manner to detachably secure the ornamental member to the wheel.

The novel features which I believe to be characteristic of my invention are set forth with particularity in the appended claims. My invention itself, however, both as to its organization and manner of construction, together with further objects and advantages may best be understood by reference to the following description taken in connection with the accompanying drawing, in which:

Figure 1 is a cross-sectional view of an outer portion of a vehicle wheel and having secured thereon an ornamental member;

Figure 2 is a plan view of the under side of the ornamental member of Figure 1; and Figure 3 is a cross-sectional view of a wheel and an ornamental member secured thereon, showing a different embodiment of the invention from that shown in Figures 1 and 2.

Referring now to Figures 1 and 2 of the drawing, the wheel assembly illustrated includes a wheel 10 having a rim part 11 and a body part 12. The rim 11 is illustrated as being of the usual drop center type having a base flange 13, opposite side flanges 14 (only one of which is shown), opposite intermediate flanges 15 (only one of which is shown), and opposite edge portions 16 (only one of which is shown). The body part 12 of wheel 10 includes a substantially laterally extending flange 17, the outer edge portion 18 of which is adapted to fit below the base flange 13 of the rim 11 and be secured thereto in any suitable manner, such as by welding, riveting, or the like. While not shown in the drawing, it is to be understood that the central portion of the body part 12 includes a suitable fastening flange which is adapted to be secured by bolts or the like to a wheel mounting plate on the face of a vehicle brake drum. This form of wheel in general has been almost universally adopted by manufacturers of automobile wheels and for that reason it is believed not necessary to completely illustrate the wheel structure.

Disposed over the outer side of the vehicle wheel 10 is an ornamental member 19. While ornamental member 19 may vary in configuration through wide limits without departing from the spirit and scope of the present invention, it is illustrated as being a relatively large dome shaped member having an underturned outer edge 20, which is arranged to extend into engagement with the wheel in proximity to the junction point of the laterally extending flange 17 of the wheel body part 12 and the base flange 13 of rim 11.

Secured to the under surface of ornamental member 19 adjacent underturned edge 20 is a plurality of flexible spring elements 21. More particularly elements 21 include a tail portion 22 which intimately engages the under surface of ornamental member 19 and is secured thereto in some suitable manner such as by welding, a body portion 23 which extends substantially axially outwardly and radially inwardly of the wheel with respect to the point at which the element 21 is secured to ornamental member 19, and a free end portion 24 which is bent outwardly at a substantial angle to the direction of normal extension of the body part 23 of spring elements 21. Outwardly bent end portion 24 of spring elements 21 provides a cam surface which is arranged to engage the forward edge of an annular groove 25 in wheel body part 12 near the outer edge of laterally extending flange 17. As will presently be understood, ornamental member 19 is detachably retained in desired position on wheel 10 by positioning the free end portion 24 of spring element 21 in groove 25 of wheel body part 12.

As will now be explained, a spring element of the type described above provides an easy-on, hard-off detachable securing means. It is to be observed that while the elements 21 are easily flexed (in a counterclockwise direction as viewed in Figure 1) in response to an axially inward movement of member 19, the elements 21 are extremely difficult to flex (in a counterclockwise direction as viewed in Figure 1) in response to an axially outward movement of member 19.

As the ornamental member 19 is moved to the left as viewed in Figure 1, the spring elements 21 are flexed in a counterclockwise direction as they ride over the forward edge 26 of laterally extending flange 17. Since the point of flexure, that is, the point at which the tail portion 22 of spring elements 21 is secured to the under surface of ornamental member 19, is well ahead of the point at which the spring elements 21 engage the forward edge 26 of flange 17, as taken with respect to the direction of movement of ornamental member 19, it is obvious that very little effort and force is necessary to cause the spring elements 21 to ride over the forward hump 26 of flange 17. It will be observed at once that after spring elements 21 have once passed over the hump portion 26 and dropped into groove 25 of laterally extending flange 17 the ornamental member 19 is securely mounted on the wheel 10. Subsequent outward movement of ornamental member 19 is restrained by virtue of the fact that the spring elements 21 are very difficult to flex in response to movement of ornamental member 19 outwardly (that is, in response to movement of ornamental member 19 to the right, as viewed in Figure 1).

In order to disengage ornamental member 19 from wheel 10, a relatively great force is required such as may be obtained with a pry-off tool or the like. This is by reason of the fact that when movement of ornamental member 19 from left to right, as viewed in Figure 1, is desired, the point of engagement of the bent end portion 24 of spring elements 21 with the forward wall of groove 25 is ahead of the point of flexure of the spring elements. In other words, when an effort is made to move ornamental member 19 from left to right, the spring elements 21 tend to buckle in their middle rather than flex upwardly out of engagement with the forward wall of groove 25. The spring elements 21, however, are designed so that they are too stiff to buckle. The result is that when sufficient force is applied tending to move the ornamental member 19 away from the wheel, the spring elements 21 will flex outwardly out of engagement with the groove 25. The amount of force which is necessary to remove ornamental member 19 from the wheel assembly may be adjusted by varying the angle at which the main body of the spring elements 21 extend away from its point of flexure, or by varying the angle at which the tip portion 31 is disposed with respect to the direction of the removal force (that is to say, in respect to the horizontal).

Although I have described the laterally extending flange 17 of the wheel body part 12 as being provided with a groove 25 into which the free end portions 24 of the spring elements 21 are adapted to engage, it will be at once apparent that an annular series of indentations disposed opposite the free ends 24 of the spring elements 21 may be employed with equal success in the place of the groove 25 described above.

In Figure 3 a modification of this invention is illustrated. For purposes of clarity similar elements of the wheel assembly have been given the same reference numerals as those employed in Figures 1 and 2 of the drawing. The wheel 10 has a configuration similar to that described in connection with Figure 1 but in the place of the annular groove 25 in the laterally extending flange 17 an annular series of apertures 27 is substituted therefor. The ornamental member 19 has secured on its under surface near its outer marginal edge a plurality of flexible spring elements 21 of the type previously described. Each flexible spring element 21 includes an outwardly bent free end portion 24 which is adapted to engage the forward edge 28 of an aperture 27. The manner in which the spring elements 21 are secured to ornamental member 19 is also slightly different in this form of the invention in that the tail portion 22 is rolled in such a manner as to be firmly nested within the curled underturned edge 20 of ornamental member 19. The curled tail portion 22 of each spring element 21 may be welded or otherwise suitably secured to the curled underturned edge 20 of ornamental member 19 if desired.

As will readily be understood by those skilled in the art, the flexible spring elements 21 operate in precisely the same manner in this form of the invention as that described in connection with Figures 1 and 2 of the drawing since the forward edge 28 of each aperture 27 cooperates with the outturned free end 24 of each spring element in precisely the same manner as the forward wall of the groove 25 cooperated with the flexible spring element in the preferred embodiment of the invention.

From the above description, it will be apparent that I have provided an extraordinarily simple, yet effective arrangement for detachably securing an ornamental member to a wheel. The novel arrangement permits the ornamental member to be mounted on the wheel by simply moving it inwardly against the side of the wheel with the application of a relatively slight force and with little effort. Inasmuch as the removal of the ornamental member from the wheel requires a relatively great force, it is clear that the ornamental member is firmly secured on the wheel and cannot accidentally be jarred loose.

While I have shown particular embodiments of my invention, it will of course, be understood that I do not wish to be limited thereto since many modifications may be made, and I therefore contemplate by the appended claims to cover all such modifications as fall within the true spirit and scope of my invention.

I claim as my invention:

1. A combination comprising a wheel, an ornamental member for disposition on the outer side of the wheel, and means for securing said member to said wheel including a flexible spring element secured at one end to said member and extending axially outwardly from the point of securement thereto into a bent free end portion engageable with a portion of said wheel axially outwardly of the wheel with respect to said point of securement of said element on said member.

2. The combination comprising a wheel having an indented portion in its outer face, an ornamental member for disposition on the outer side of the wheel, and means for securing said member to said wheel including a flexible spring element secured at one end to said member and having an outwardly bent free end portion engageable with said indented portion of said wheel, said spring element being so arranged that the median plane of said wheel is nearer to the point of flexure of said spring element than to the indented portion of said wheel.

3. The combination comprising a wheel, an ornamental member for disposition on the outer side of said wheel, and a plurality of resilient leaf ornamental member retaining elements each secured to said ornamental member at one end and extending radially inwardly and axially outwardly, each element being bent at its free end to form a cam surface at a substantial angle to the direction of major extension, said cam surface being adapted to engage a portion of said wheel to retain said ornamental member in desired position thereon.

4. The combination comprising a wheel having rim and body parts, said body parts including a substantially laterally extending flange having an annular series of apertures therein, an ornamental member for disposition over said body parts and means for detachably securing said ornamental member on said wheel including a flexible spring element secured at one end to said ornamental member and having its other end bent at a substantial angle to itself to form a wheel engaging surface adapted to engage an aperture defining edge of said body part, said spring element being so arranged that the major flexure thereof occurs axially inwardly of the wheel with respect to said apertures and also on the exterior of the wheel.

5. The combination comprising a wheel having rim and body parts, said body parts including a substantially laterally extending flange having an annular groove therein, an ornamental member for disposition on the outer side of said wheel, and means for securing said member to said wheel including a flexible spring element secured to said member near its outer edge and extending radially inwardly and axially outwardly, said element being bent at a free end to form a cam surface at a substantial angle to the direction of major extension of said element, said cam surface being adapted to engage said groove, whereby said securing means provides an easy-on hard-off securing engagement between said ornamental member in said wheel.

6. The combination comprising a wheel having rim and body parts, said body parts including a substantially laterally extending flange having an annular series of apertures therein, an ornamental member for disposition on the outer side of said wheel, means for detachably securing said ornamental member to said wheel including a flexible spring element having one end secured to said ornamental member near its outer edge and extending radially inwardly and axially outwardly, said element being bent at a free end to form a cam surface at a substantial angle to the direction of normal extension of said element, said cam surface being adapted to engage an aperture defining edge of said body part, whereby said securing means provides an easy-on hard-off securing engagement between said ornamental member and said wheel.

7. The combination comprising a wheel having rim and body parts, said body parts including a substantially laterally extending flange having an annular series of apertures therein, an ornamental member for disposition on the outer side of said wheel having an underturned and curled outer marginal edge, means for detachably securing said ornamental member to said wheel including a flexible spring element having one end curled and nested in said underturned edge of said ornamental member, said element being bent at its other end to form a cam surface at a substantial angle to the direction of extension of said element, said cam surface being adapted to engage an aperture defining edge of said body part, whereby said securing means provides an easy-on hard-off securing engagement between said ornamental member and said wheel.

8. In combination, a vehicle wheel including a body part having an external surface, a closure member for disposition over the external surface of the body part of said vehicle wheel comprising a hollow concavo-convex disk having secured to it internally thereof a plurality of spring retaining elements formed for a snap-on engagement with a portion of the wheel body, each including a leg secured to the disk and a free leg inclined radially inwardly and in an axial direction away from the external surface of the wheel body part for engagement with said wheel body part.

9. For use with a vehicle wheel, a closure member for disposition over the outer side of the body part of a wheel comprising a hollow concavo-convex disk having secured to it internally thereof and wholly concealed thereby a plurality of spring clips axially projecting toward the hollow portion of the disk, to fit over and have a snap-on retaining engagement with a portion of said wheel body part.

10. In combination, a wheel structure including a wheel having an outer tire rim and an inner wheel body provided with laterally projecting wheel cover retaining means, and a circular wheel cover for disposition over said wheel body including a circular crown portion having a concealed curled edge provided with resilient means for snap-on engagement with said wheel body retaining means, said wheel body retaining means having a surface extending obliquely with respect to said wheel body, and said cover resilient means extending to a point axially behind said retaining means and against the oblique surface thereof.

GEORGE ALBERT LYON.